United States Patent [19]

Gleim

[11] 4,279,736
[45] Jul. 21, 1981

[54] METHOD OF HYDROREFINING ASPHALTENIC HYDROCARBON FEEDSTOCKS

[76] Inventor: William K. T. Gleim, 1250 NW. 120th St., Seattle, Wash. 98177

[21] Appl. No.: 87,506

[22] Filed: Oct. 23, 1979

[51] Int. Cl.$^3$ ............................................. C10G 45/16
[52] U.S. Cl. ...................................... 208/215; 208/39; 252/439; 252/441
[58] Field of Search ........................ 208/39, 108, 215

[56] References Cited

U.S. PATENT DOCUMENTS

| | | | |
|---|---|---|---|
| 2,038,599 | 4/1936 | Pier et al. | 208/10 |
| 2,127,383 | 8/1938 | Pier et al. | 208/108 X |
| 4,214,977 | 7/1980 | Ranganathan et al. | 208/108 |

FOREIGN PATENT DOCUMENTS 1224288 9/1966 Fed. Rep. of Germany ........... 423/511

*Primary Examiner*—Delbert E. Gantz
*Assistant Examiner*—G. E. Schmitkons
*Attorney, Agent, or Firm*—Peter J. Georges

[57] ABSTRACT

A method of hydrorefining an asphaltenic charge stock is described which comprises effecting said reaction utilizing a titanium sulfide catalyst in a hydrogen sulfide-containing $H_2$ atmosphere. The catalyst may be employed in slurry form or composited with a high surface area coke support. Preferably chloride is also present in the catalyst. The hydrogen sulfide suitably is present in the gas phase in an amount of from about 10 to about 25 mol. percent based on the moles of $H_2$ present.

15 Claims, No Drawings

METHOD OF HYDROREFINING ASPHALTENIC HYDROCARBON FEEDSTOCKS

BACKGROUND OF THE INVENTION

1. Field of the Invention

This invention relates to a method of hydrorefining an asphaltenic charge stock, i.e. converting the colloidally suspended asphaltenes to oil soluble components, by effecting the reaction utilizing a titanium sulfide catalyst which preferably also contains titanium chloride in an hydrogen atmosphere containing from about 10 to about 25 mol. percent of hydrogen sulfide.

2. Description of the Prior Art

In the development of alternative methods of hydrorefining asphaltenic feedstocks in such a manner as to convert the colloidal asphaltenic components to oil soluble compounds, a number of problems must be overcome. Generally asphaltenic feedstocks contain a variety of contaminants. The high quantity of sulfur generally present, mandates that the catalyst be sulfur tolerant. At the same time, the catalyst must function in such manner that the colloidal asphaltenes are converted into useful hydrocarbon fractions without the generally observed decomposition to coke, gas and light liquids deactivating the catalyst.

Both vanadium and titanium sulfide have been described in the prior art as sulfur tolerant hydrogenation catalysts by Pier et al in U.S. Pat. Nos. 2,038,599 and 2,127,383. However, the active life of these particular catalysts where one attempts to use them in the treatment of asphaltenic feedstocks is very short, generally on the order of one or two hours. Moreover, only certain forms of vanadium sulfide are active. Additionally, temperatures exceeding 380° C. are required where the foregoing catalysts are used. I have observed that the activity of vanadium sulfides may be conserved by the addition of $H_2S$ to the gas phase.

In accordance with the present invention I have discovered a new method for hydrorefining asphaltenic feedstocks whereby the colloidal asphaltenic component of such feedstocks is converted into oil-soluble hydrocarbon fractions, which method may be operated at much lower temperatures than heretofor previously possible. This result is obtained by selecting a specific titanium sulfide catalyst which preferably also contains titanium chloride and effecting the hydrorefining in a gas phase containing $H_2S$ of measured amounts.

SUMMARY OF THE INVENTION

The present invention relates to a method for hydrorefining an asphaltenic charge stock, which generally contains other contaminants inclusive of sulfur and/or compounds thereof. A titanium sulfide catalyst is used in the presence of added $H_2S$ in an amount of from about 10 to about 25 mol. percent based on the hydrogen in the gaseous phase within the hydrorefining reaction zone.

The titanium sulfide catalyst which generally also contains titanium chloride may be used in the form of a slurry or deposited on a high surface area coke. Suitable cokes are those having a surface area of from about 200 to about 500 $m^2/g$, which cokes are readily available on a large scale from low temperature coking of brown coal and lignite.

The titanium sulfide catalyst generally comprises titanium sulfide wherein the molecular ratio of titanium to sulfide is from about 1:2 to about 1:3. It has been observed, in accordance with this invention, that the higher the ratio of titanium to sulfur the better the catalyst; that is, the greater the activity, stability and longevity.

Although temperatures of from about 250° C. to about 400° C. are suitable, it is most surprising that hydrogenation and depolymerization may be achieved at temperatures below 300° C.

The presence of chloride in the catalyst in an amount of from about 1% to about 10% by weight enhances the activity of the catalyst. The chloride is generally present in the form of titanium chloride.

DETAILED DESCRIPTION OF THE INVENTION

In its broadest aspect the present invention relates to a method of hydrorefining an asphaltenic charge stock with titanium sulfide, either unsupported or upon a non-oxygen containing support in the presence of hydrogen sulfide. In this regard, it is at once evident that in accordance with this invention, the refractory oxides well known to the art of hydrocarbon catalysis such as silica, alumina, silica-alumina, etc. are not suitable as supports. It is preferred to provide for the presence of chloride in the catalyst, suitably in an amount of from about 1 to about 10% by weight based on the weight of titanium sulfide present in the catalyst. As heretofor noted, the chloride is generally present in the form of titanium chlorides having less than 4 atoms of chlorine per atom of titanium.

Another aspect of the invention relates to the use of titanium sulfide wherein the mol. ratio of titanium to sulfur is from about 1:2 to about 1:3, indicated by the following sulfides $TiS_2$ and $TiS_3$. Moreover, it is preferred that a majority of the titanium sulfide be $TiS_3$.

In accordance with the present invention catalysts activity is attained at temperatures below about 300° C., with maintenance of same over extended periods of time; more than a year, provided the charge stock is free of large amounts of inorganic impurities like clay, pyrite etc. Indeed, in accordance with this invention, small amounts of organically bound metals like Ni and V are acceptable provided slurry operation is used.

A specific embodiment of the invention relates to hydrogenation and depolymerization of an asphaltenic crude oil containing pentane-insoluble asphaltenes, by contacting the crude oil in the presence of hydrogen and hydrogen sulfide, present in an amount of from about 10 to about 25 mol. percent based on $H_2$ present during hydrorefining, at a temperature with a range of from about 250° C. to about 400° C., and at a pressure of from about 500 to about 5000 pounds per square inch gauge. The product recovered is low in pentane-insoluble asphaltenes.

As hereinafter indicated the presence of hydrogen sulfide as well as the employment of titanium sulfide containing titanium chloride in specific forms is necessary to obtain desired conversion levels as well as activity and maintenance of the same over an economically viable period of process operation.

CATALYST PREPARATION

A specific form of catalyst suitable for slurry-type operation is prepared by passing $TiCl_4$ vapors through an empty tube which is heated to a temperature of 480° to 540° C. together with an excess of $H_2S$. A precipitate is formed which is a mixture of $TiS_2$ and $TiS_3$ containing chloride—in the 1–20% range in the form of a mixture of titanium chlorides with less than 4 atoms of chloride per atom of titanium. The precipitate so obtained comprises the catalyst used in upflow slurry operations, liquid continuous gas discontinuous.

A specific form of catalyst on a coke support is prepared by producing 10 to 20 mesh coke with a surface area of 450 m$^2$/g from low temperature (400° to 650° C.) brown coal or lignite coking. The resultant coke is put into a vertical reactor. TiCl$_4$ vapors are passed through this coke bed at a temperature of 150° to 200° C. until 20% of the TiCl$_4$ by weight is absorbed by the coke, H$_2$S is now passed through the coke bed containing 20% absorbed TiCl$_4$ and the temperature of the bed is raised to a temperature of from 480° to 540° C. until about 90% of the chloride is removed with the excess H$_2$S. The resultant catalyst is available for gas continuous, liquid discontinuous down-flow operation.

EXAMPLE 1

Four hundred grams of an asphaltenic feedstock, a topped Wyoming sour crude having a gravity of 19.5 °API at 60° F., containing about 3% by weight of sulfur, approximately 2800 p.p.m. nitrogen, calculated as elements thereof and 8.5% by weight of pentane insoluble asphaltenes is admixed with 20 g of the slurry catalyst and hydrorefined at a temperature of 280° C. and 150 atmospheres of H$_2$ containing 15 mol % H$_2$S in an 1800 ml. rotating autoclave for 4 hours. The reaction product upon separation from the catalyst by autoclaving is found to have an °API at 60° F. of 31, and the asphaltenes and sulfur are reduced respectively to 1.1% and 1.3% by weight.

EXAMPLE 2

Four hundred grams of an asphaltenic feedstock, a topped Wyoming sour crude having a gravity of 19.5 °API at 60° F., containing about 3% by weight of sulfur, approximately 2800 p.p.m. nitrogen, calculated as elements thereof and 8.5% by weight of pentane insoluble asphaltenes is admixed with 40 g of the supported catalyst and hydrorefined for four hours in an 1800 ml. autoclave at 295° C. and 150 atmospheres of a gas mixture consisting of H$_2$ containing 20 mol. % H$_2$S. The reaction product upon separation from the catalyst by centrifuging is found to have an °API at 60° F. of 30 and the asphaltenes and sulfur are reduced respectively to 1.4% and 1.6% by weight.

Thus a new method of hydrorefining asphaltenic feedstocks using a titanium sulfide-titanium chloride catalyst in the presence of added hydrogen sulfide is disclosed. Specific examples of the invention have hereinabove been described; however, as will be obvious to those skilled in the art, various modifications may be made without departing from the spirit of the invention which is intended to be limited solely by the appended claims.

I claim:

1. A method of hydrorefining an asphaltenic charge stock in a hydrogen atmosphere which comprises effecting said reaction in the presence of a mixture of titanium sulfides wherein the molecular ratio of titanium to sulfide is from about 1:2 to about 1:3 and in the presence of from about 10 to about 25 mol. percent hydrogen sulfide based on said hydrogen.

2. The method of claim 1 wherein the titanium sulfide is in the form of a slurry.

3. The method of claim 1 wherein the titanium sulfide is in the form of a slurry, and the titanium sulfide further comprises from about 1% to about 10% by weight chloride based on the weight of titanium sulfide, said chloride being present in the form of titanium chloride, said titanium chloride having 2 or less chlorine atoms for each atom of titanium.

4. The method of claim 3 wherein the process is effected at a pressure of from about 1,000 to about 3,000 p.s.i.g. and a temperature of from about 250° C. to about 400° C.

5. The method of claim 1 wherein the catalyst further comprises titanium sulfide and titanium chloride composited with a high surface area coke of from about 200 to about 500 m$^2$/g.

6. The method of claim 5 wherein the catalyst further comprises from about 1% to about 10% by weight chloride based on the titanium sulfide.

7. The method of claim 5 wherein the carbon support is a low temperature coke produced from brown coal or lignite.

8. The method of claim 6 wherein the carbon support is a low temperature coke produced from brown coal or lignite.

9. The method of claim 6 wherein the titanium sulfide is in the form of a slurry, and the titanium sulfide further comprises (1) a mixture of titanium sulfides wherein the molecular ratio of titanium to sulfide is from about 1:2 to about 1:3 and (2) from about 1% to about 10% by weight chlorine based on the weight of titanium sulfide, said chlorine being present in the form of titanium chloride, said titanium chloride having 3 or less chlorine atoms for each atom of titanium.

10. The method of claim 1 wherein said process is effected at a temperature below about 300° C.

11. The method of claim 2 wherein said process is effected at a temperature below about 300° C.

12. The method of claim 5 wherein said process is effected at a temperature below about 300° C.

13. The method of claim 6 wherein said process is effected at a temperature below about 300° C.

14. The method of claim 7 wherein said process is effected at a temperature below about 300° C.

15. The method of claim 8 wherein said process is effected at a temperature below about 300° C.

* * * * *